US011561031B2

(12) United States Patent
Linares

(10) Patent No.: US 11,561,031 B2
(45) Date of Patent: Jan. 24, 2023

(54) MAGNETIC INDUCTION FURNACE, COOLER OR MAGNETOCALORIC FLUID HEAT PUMP INTEGRATED INTO A ROTARY BLOWER AND INCLUDING TWO STAGE INDUCTIVE HEATING OR COOLING

(71) Applicant: Heat X, LLC, Auburn Hills, MI (US)

(72) Inventor: Miguel A. Linares, Bloomfield Hills, MI (US)

(73) Assignee: Heat X, LLC, Auburn Hills, MI (US)

( * ) Notice: Subject to any disclaimer, the term of this patent is extended or adjusted under 35 U.S.C. 154(b) by 41 days.

(21) Appl. No.: 17/082,106

(22) Filed: Oct. 28, 2020

(65) Prior Publication Data

US 2021/0123640 A1   Apr. 29, 2021

Related U.S. Application Data

(60) Provisional application No. 62/926,672, filed on Oct. 28, 2019.

(51) Int. Cl.
 *F25B 21/00* (2006.01)
(52) U.S. Cl.
 CPC ...... *F25B 21/00* (2013.01); *F25B 2321/0022* (2013.01)
(58) Field of Classification Search
 CPC ............. F25B 21/00; F25B 2321/0022; G05D 23/1919
 See application file for complete search history.

(56) References Cited

U.S. PATENT DOCUMENTS 4,642,994 A * 2/1987 Barclay ................... F25B 21/00
                                                        62/3.3
6,177,660 B1 * 1/2001 Usui ...................... H05B 6/108
                                                        219/618
6,297,484 B1 * 10/2001 Usui ...................... F24V 99/00
                                                        219/628

(Continued)

FOREIGN PATENT DOCUMENTS

GB          2340549 A  *  2/2000  ............... B60H 1/22
JP       2000-272331 A    10/2000
KR    10-2009-0081981 A    7/2009

OTHER PUBLICATIONS

International Search Report and Written Opinion issued by the Korean Intellectual Property Office for International Patent Application No. PCT/US2020/057665 dated Feb. 22, 2021(5 pages).

*Primary Examiner* — Gordon A Jones
(74) *Attorney, Agent, or Firm* — Dinsmore & Shohl LLP

(57) ABSTRACT

A multi-stage fluid conditioning system having a housing with a fluid inlet and outlet. A shaft extends within the housing and supports a first fan unit with a first magnet/electromagnet plate on an inlet side of said housing and a second fan unit with a second magnet/electromagnet supporting plate on an outlet side of the housing. Each of the first and second magnet/electromagnet supporting plates include at least one vane configured to direct fluid flow. The shaft rotates the plates in order to draw a fluid flow through the inlet and successively across the inlet and outlet sides for thermal conditioning resulting from creation of high frequency oscillating magnetic fields according to a succeeding conditioning operations before being outputted the conditioned fluid from the housing through the fluid outlet.

17 Claims, 3 Drawing Sheets

(56) References Cited

U.S. PATENT DOCUMENTS

| | | |
|---|---|---|
| 6,676,366 B2 | 1/2004 | Kao |
| 8,418,476 B2 * | 4/2013 | Heitzler ............... F25B 21/00 |
| | | 62/3.1 |
| 8,418,832 B1 * | 4/2013 | Albertson ............ F25B 15/00 |
| | | 219/628 |
| 9,516,703 B1 * | 12/2016 | Nelson ................. H05B 6/109 |
| 10,425,998 B2 * | 9/2019 | Nangle ................ H05B 6/109 |
| 2006/0086729 A1 | 4/2006 | Lunneborg |
| 2011/0215089 A1 | 9/2011 | Garza |
| 2013/0062340 A1 | 3/2013 | Hsu |
| 2017/0361001 A1 | 12/2017 | Canatella et al. |
| 2018/0347563 A1 | 12/2018 | Wollmann |

* cited by examiner

MAGNETIC INDUCTION FURNACE, COOLER OR MAGNETOCALORIC FLUID HEAT PUMP INTEGRATED INTO A ROTARY BLOWER AND INCLUDING TWO STAGE INDUCTIVE HEATING OR COOLING

CROSS REFERENCE TO RELATED APPLICATIONS

The present application claims the priority of U.S. Ser. No. 62/926,672 filed Oct. 28, 2019, the contents of which are hereby incorporated by reference in its entirety.

BACKGROUND

The phenomena of magnetic or electromagnetic induction heating is well known in the prior art by which heat is generated in an electrically conductive object by the generation of eddy currents, also called Joule heating. The typical induction heater includes an electronic oscillator which passes a high frequency alternating current through an electromagnet. The eddy currents flowing through the resistance of a conductive metal placed in proximity to the magnet/electromagnet in turn heat it. Put another way, the eddy currents result in a high-frequency oscillating magnetic field which causes the magnet's polarity to switch back and forth at a high-enough rate to produce heat as byproduct of friction.

One known example of a prior art heating system is taught by the electromagnetic induction air heater of Garza, US 2011/0215089. Another known device is the centrifugal magnetic heating device of Hsu 2013/0062340.

SUMMARY

This disclosure relates generally to multi-stage fluid conditioning systems, such as an electromagnetic or magnetic induction furnace, an electromagnetic or magnetic induction cooler or magnetocaloric fluid heat pump. More specifically, the disclosure relates to fluid conditioning system includes a pair of spaced apart and co-rotating magnet/electromagnet plate configurations integrated into, for example, a rotary blower style housing, the rotating plate configurations included in fan units associated with an intake and an exhaust. The housing may have different material constructions: in one example embodiment, the housing may be constructed of insulating materials and may have its interior or exterior paneled or coated with one or more conductive materials. In another example embodiment, the housing may be constructed with one or more conductive materials completely. In one example, the housing includes one or more ambient fluid intakes at locations on a first side of the housing. The intake/exhaust fan units including magnetic plates each include vane profiles to direct fluid flow, with the intake fan unit located on the inlet side of the housing for drawing in fluid, which is initially heated or cooled and then redirecting the intake fluid (e.g. air or other fluid) through interior pathways configured in communication to the second outlet side arranged exhaust fan unit for providing additional inductive heating, or conditioning. The fluid is then expelled through a forward radially directed outlet associated with the housing in communication with the exhaust fan unit.

In one non-limiting embodiment, a two stage fluid conditioning system includes a housing constructed of, for example, an insulating material with a fluid inlet and a fluid outlet. Additional envisioned variants can include making the present assembly modularize-able or stackable in order to incorporate additional intermediate stages between the inlet side stage and outlet side stage. A rotating shaft extends within the housing and supports at least two spaced part fan units each including a magnet/electromagnet supporting plate. One fan unit is associated with an intake and one fan unit is associated with an outlet fan. Each of the magnet/electromagnet supporting plates further vanes for directing fluid flow.

In one example embodiment, surfaces of the housing proximate the magnet/electromagnet supporting plates may further include either of panels or coatings of thermally conductive materials. In another non-limiting example embodiment, the housing is comprised entirely of conductive material. Upon rotating the magnet/electromagnet supporting plates, a fluid flow is initially drawn across the first magnet/electromagnet supporting plate for thermal conditioning resulting from creation of high frequency oscillating magnetic fields according to a first conditioning operation. The fluid is subsequently drawn across the second magnet/electromagnet supporting plate in a secondary conditioning operation prior to being outputted through the outlet of the housing.

Additional non-limiting example features of the fan unit include the fluid flow directing vanes include a first inner plurality of circumferentially arrayed vanes and a second outer plurality of circumferentially arrayed vanes. Fluid inlets further may include each of side inlets and a housing end (or intake side) located fluid inlets associated with the first fan unit and/or a second, fluid inlet for ambient temperature fluid being further associated with the second fan unit. The side inlets may further include a plurality of slot shaped inlets extending circumferentially around a middle location of the housing. The housing end located fluid inlet may further include a center intake serving as a primary intake.

The housing including conductive material, coatings, or panels can include any metal or alloy, ceramic or other metal ceramic composite material, graphic or other combination thereof. Additionally, multiple, or a second, thermally, conductive materials may be used, likewise, any metal or alloy, ceramic or any metal-ceramic composite material, graphite or combination of such conductive materials.

Other non-limiting example features include the magnet/electromagnet supporting plates including a first plate section (core portion) and a second plate section radially outward of the first plate. In one example, the first plate section may integrate a plurality of circumferentially arranged magnets or electromagnets. In one non-limiting example, vanes are arranged on each of the first plate section and the second plate section in directionally opposing pluralities. The first plate section (core portion) further incorporates any of a magnetic flux heated and thermally conductive materials, which again can include any of metal, alloys, ceramics, metal-ceramic composite materials, graphite or combination thereof of conductive materials.

Yet additional non-limiting, example features include at least one motor or input drive for powering the rotating shaft, the motor(s) or input drive(s) being located at any interior or exterior position relative to the housing. In one example, the motor(s) or input drive(s) can be split into, or include, a pair of units associated with each of first sub-chamber of the housing associated with the first fan unit and a second sub-chamber of the housing associated with the second fan unit. In one non-limiting example, the pair of fan units may operate synchronously or asynchronously.

An example method of fluid conditioning includes communicating fluid into a first sub-chamber of a housing at a first end of the housing using a first fan unit comprising a magnetic/electromagnetic plate and at least one vane. Fluid flow is directed using the at least one vane of the first fan unit. A shaft is rotated to thereby rotate at least a portion of the magnetic/electromagnetic plate of the first fan unit, thereby conditioning fluid by the creation of high frequency oscillating magnetic fields according to a first conditioning operation of the first fan unit and communication of the fluid around the first fan unit. The fluid is communicated through interior passages of the housing to a second sub-chamber of the housing. A second fan unit comprising a magnetic/electromagnetic plate and at least one vane is disposed in the second sub-chamber. The shaft is rotated to thereby rotate at least a portion of the magnetic/electromagnetic plate of the second fan unit, thereby conditioning fluid by the creation of high frequency oscillating magnetic fields according to a second conditioning operation of the second fan unit and communication of the fluid around the second fan unit. The fluid is communicated through an outlet of the housing so that the fluid exits the housing.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION

Figure 1:
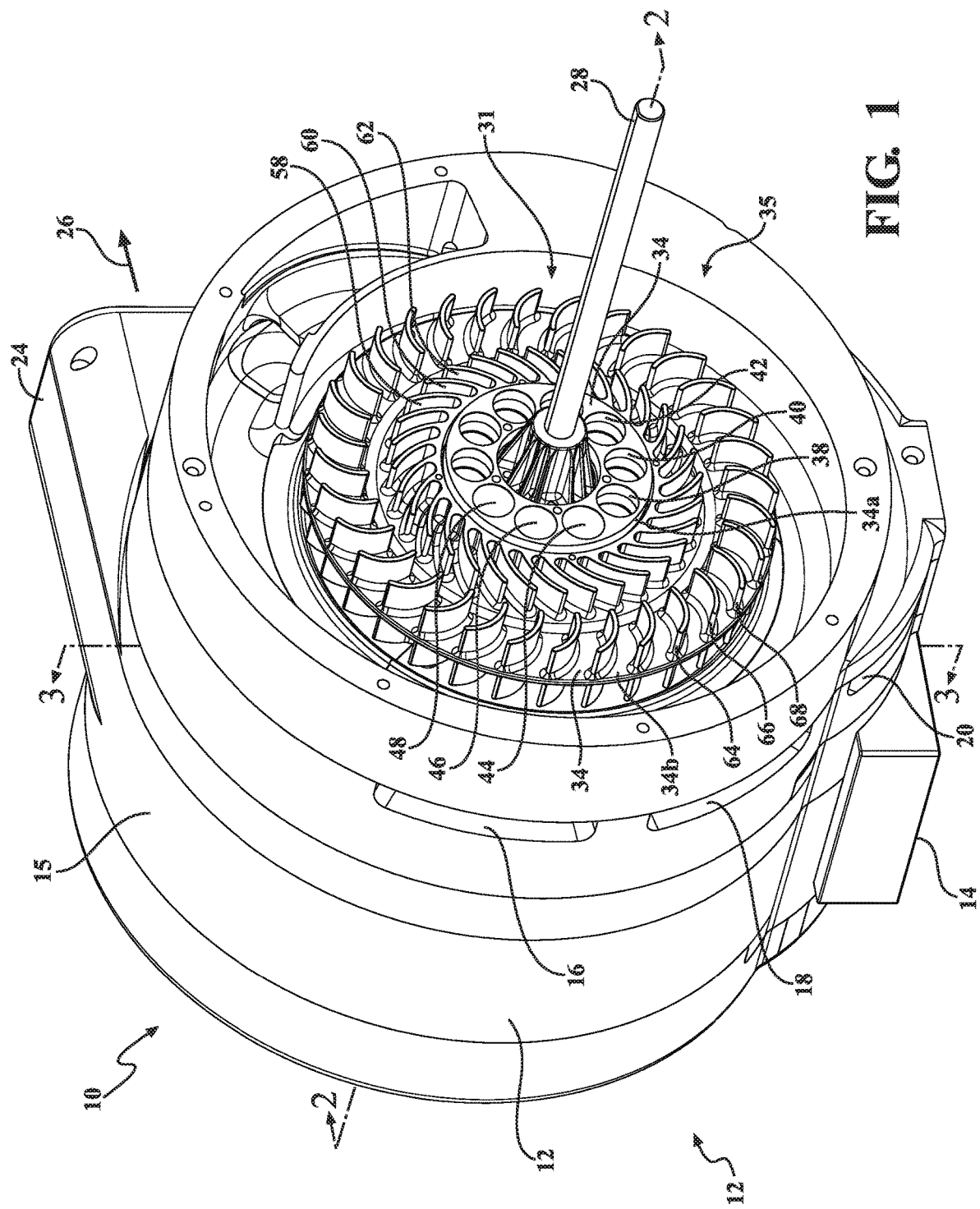
FIG. 1 a perspective and partially cutaway view of a non-limiting, example fluid conditioning system according to a first, non-limiting embodiment.
Figure 2:
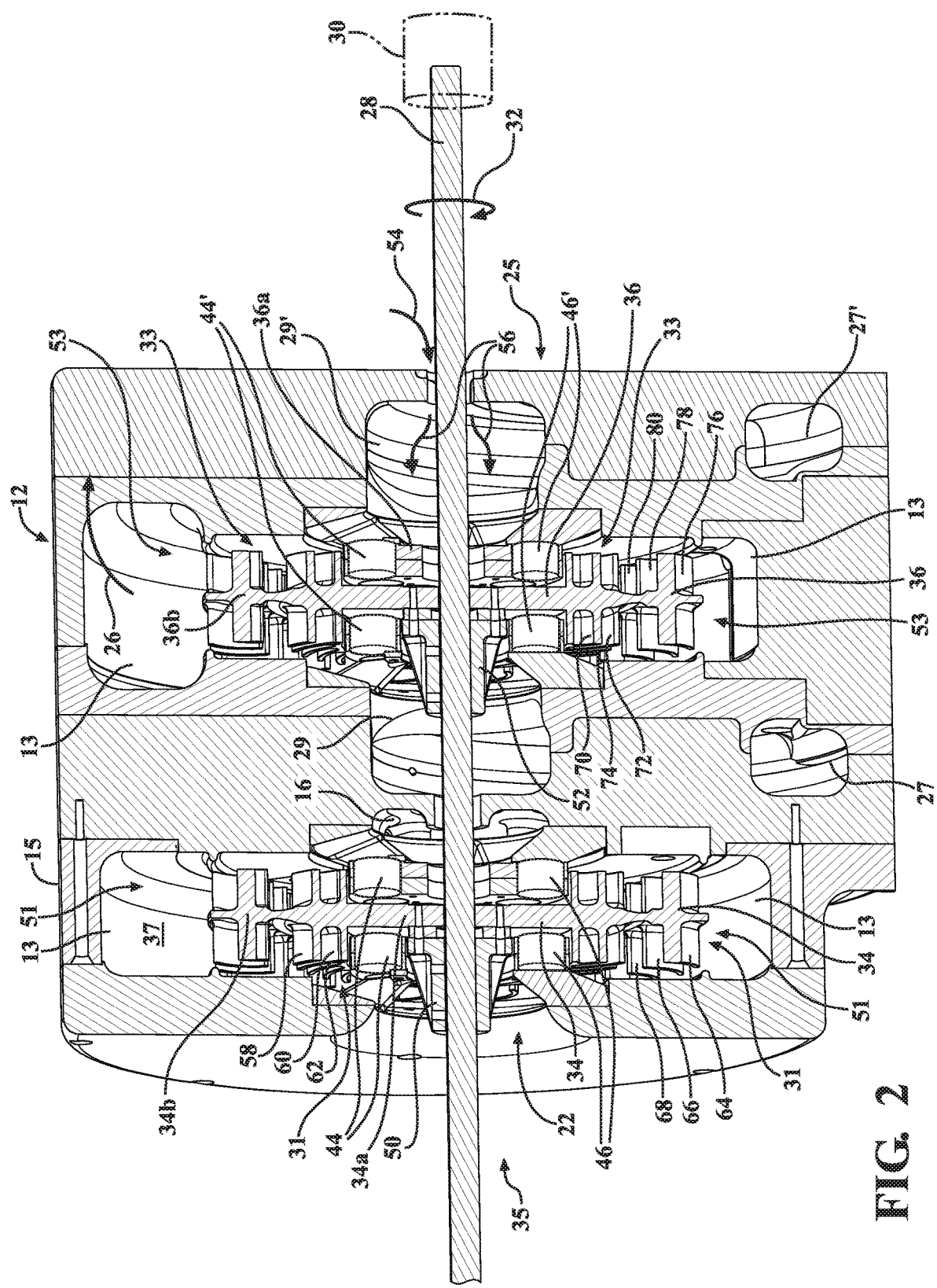
FIG. 2 is a rotated and width cutaway along line 2-2 of FIG. 1 further showing example dual spaced apart fan unit each with a rotating magnetic/electromagnetic plate configuration along with the side and end located fluid inlet locations and interior fluid communicating channels, or passageways, extending to the forward radial outlet, as well as other features of the housing and fluid conditioning system.
Figure 3:
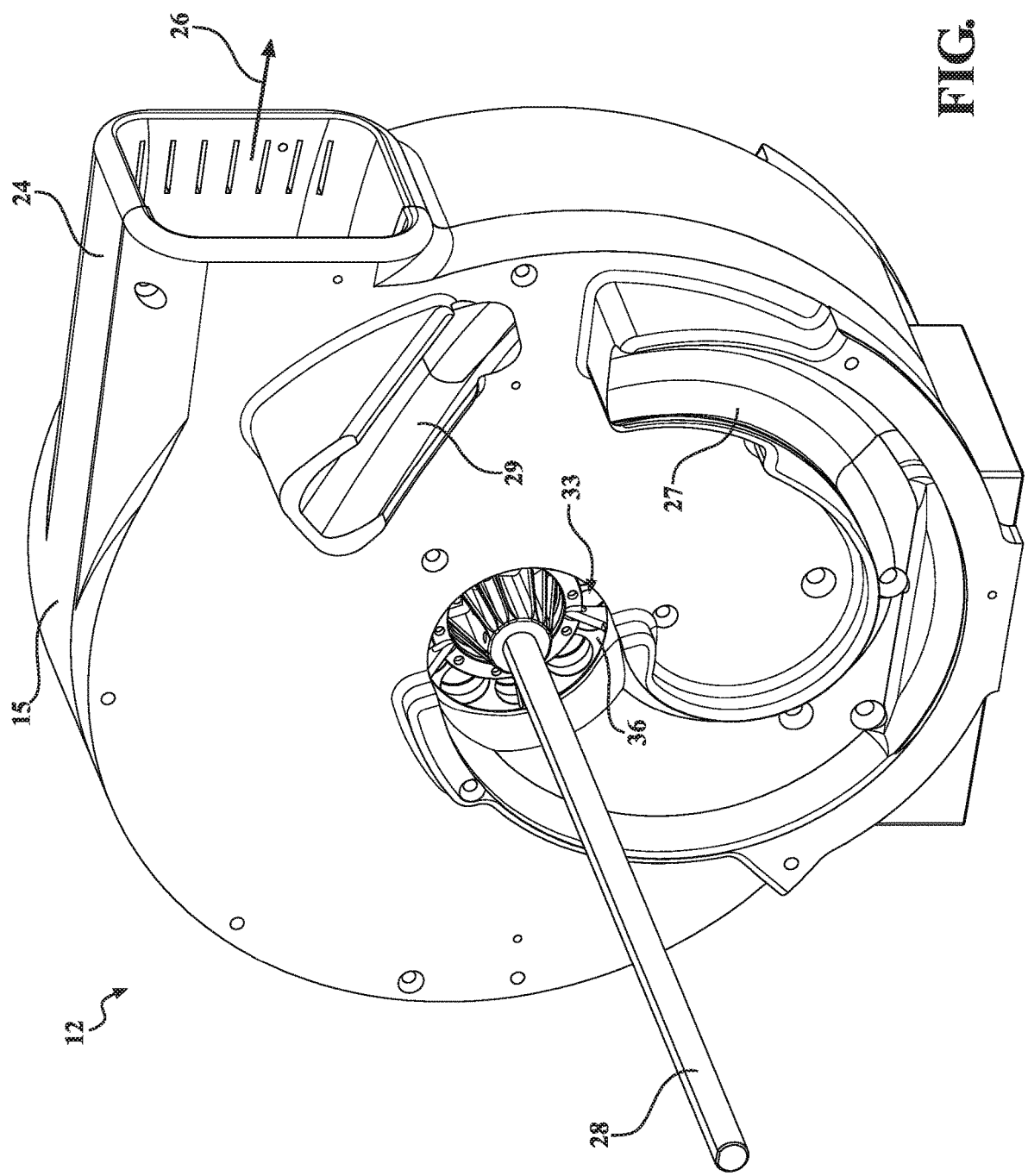
FIG. 3 is a further cutaway taken along line 3-3 of FIG. 1 showing a half section of the housing including the exhaust side fan unit with an example interior arcuate passageway extending within the housing.

With reference to FIGS. 1-3, a non-limiting example fluid conditioning system 10, such as, but not limited to, a magnetic or electromagnetic induction furnace, a magnetic or electromagnetic cooler, or magnetocaloric fluid heat pump, is shown. As will be further described, the example fluid conditioning system 10 incorporates a first fan unit 31 and second fan unit 33. The first fan unit 31 includes a rotatable magnet/electromagnetic plate 34 and the second fan unit 33 includes a rotatable magnet/electromagnetic plate 36. Magnet/electromagnet supporting plate 34 includes a first plate section 34a and a second plate section 34b radially outward of the first plate section 34a relative to a shaft, such as central shaft 28. Magnet/electromagnet supporting plate 36 includes a first plate section 36a and a second plate section 36b radially outward of the first plate section 36a relative to a shaft, such as central shaft 28. First plate section 34a includes a first plurality of vanes 58/60/62 and second plate section 34b includes a second plurality of vanes 64/66/68. Likewise, first plate section 36a includes a first plurality of vanes 70/72/74 and second plate section 36b includes a second plurality of vanes 76/78/80. In one non-limiting example, the first plurality of vanes 58/60/62 are arranged in a direction opposite the second plurality of vanes 64/66/68 of the first plate 34. Likewise, this arrangement may be used for the first plurality of vanes 70/72/74 and second plurality of vanes 76/78/80 of the second magnet/electromagnet supporting plate 36. The first fan unit 31 and second fan unit 33 allow for the intake, movement and output of fluid within the housing 12 while at the same time providing for the conditioning of that fluid, including heating and/or cooling of the fluid.

In one example, the first plate section 34a and second plate section 34b are individual plates. In this example, first plate section 34a rotates while second plate section 34b remains stationary. In another example, during use first plate section 34a remains stationary while second plate section 34b rotates. In yet another example, first plate section 34a and second plate section 34b counter rotate such that each plate section 34a/34b rotates in a direction opposite the other.

In one example, the first plate section 36a and second plate section 36b are individual plates. In this example, first plate section 36a rotates while second plate section 36b remains stationary. In another example, during use first plate section 36a remains stationary while second plate section 36b rotates. In yet another example, first plate section 36a and second plate section 36b counter rotate such that each plate section 36a/36b rotates in a direction opposite the other. The rotational relationship of the plate sections 34a/34b of the first magnet/electromagnet supporting plate 34 may be the same or different than the rotational relationship of the plate sections 36a/36b of the second magnet/electromagnet supporting plate 36.

The first fan unit 31 is associated with and defines a primary inlet side 35 of a housing 12 and the second fan unit 33 is located near an outlet 26 of the housing 12. In one non-limiting example, the first fan unit 31 and second fan unit 33 are integrated into the housing 12 and rotate within the housing 12. In one example, the inlet side 35 allows for cold or ambient air intake and the outlet 26 provides for a warm air outlet. The housing 12 may have different material constructions: in one non-limiting example, housing 12 may be constructed of insulating materials and may have its interior or exterior paneled or coated with one ore more conductive materials. In another non-limiting example, housing 12 may be constructed with one or more conductive materials completely. That is, housing 12 includes only conductive materials. Those conductive materials provide for inductive heating under magnetization or cooling under demagnetization of magnetic or electromagnetic plates 34/36. Housing 12 including conductive materials also redirects the heated/cooled, or otherwise conditioned fluid in a forward radial direction out of housing 12. In one non-limiting example, housing 12 may be rotary shaped or cabinet-like. As will be further described and with additional reference to potential alternate variants, the fluid conditioning system 10 can also be configured as any of a magnetocaloric fluid heat pump, active magnetic regenerator, magnetic/magnetocaloric refrigerator, or magnetic/electromagnetic air conditioner.

FIG. 1 shows a perspective view of an example fluid conditioning system 10, such as an electromagnetic or magnetic induction furnace, electromagnetic or magnetic induction cooler, or magnetocaloric fluid heat pump, according to a first non-limiting embodiment. The system 10 may include a three-dimensional housing 12. In one non-limiting example, the housing 12 has a generally blower shape with an annular shaped body 12*a* and a pedestal base support 14. The housing 12 may have different material constructions. In one non-limiting example, housing 12 may be constructed of insulating materials and may have its interior 13 or exterior 15 paneled or coated with one or more conductive materials. In another non-limiting example, the housing 12 may be constructed with one or more conductive materials completely.

A series of ambient air, or fluid, intake locations 16/18/20 are provided at corresponding side locations of the housing 12. The intake locations 16/18/20 include associated slot shaped inlets. However, other shaped inlets may be used at the intake locations 16/18/20. Although three intake locations 16/18/20 are shown, additional intake locations may be included or only one or two of intake locations 16/18/20 may be included. An end intake location 22 (see FIG. 2) is associated with an inlet side 35 of the housing 12. The end intake location 22 (or end inlet location) includes a center intake to the first fan unit 31 which operates to draw fluid into the housing. The housing 12 includes a structure 24 defining a fluid outlet 26. In one non-limiting example, the structure 24 is a forward radial annulus structure which defines a hot air/fluid outlet 26. In this example, the outlet 26 is generally perpendicular to a central shaft 28, described further below. In other non-limiting embodiments the outlet 26 may be arranged generally parallel to the central shaft 28 or at an angle relative to the central shaft 28. A portion of the inlet side 23 housing 12 is removed in FIG. 1 to reveal the first fan unit 31 with rotating magnet/electromagnetic plate 34 and, with further reference to FIGS. 2-3, a further explanation will be provided of the fluid conducting passageways integrated into the conductive housing 12.

The central shaft 28 is depicted which extends into or through the housing 12 and can be rotated by at least one motor or input drive generally represented at 30 in FIG. 2 as well as any other rotating input for turning the shaft, such as in direction 32, for directing or causing the heated air or other fluid to be moved through housing 12 to the outlet 26. Although not shown, it is additionally understood that the motor or input drive 30 can be located at any interior or exterior position relative to the housing 12. In one non-limiting example, the motor or input drive 30 is one of an electric motor, windmill, solar power source, hand powered, or other power system. In one non-limiting example, the motor or input drive 30 can be split into a pair of units associated with different sub-chambers 51/53 of the housing that can operate synchronously or asynchronously. Additional fan units 31, 33 and corresponding sub-chambers 51/53 may also be used.

FIG. 2 is a rotated and width cutaway along line 2-2 of FIG. 1. The dual spaced apart example first fan unit 31 and second fan unit 33 including respective rotating magnetic/electromagnetic plates, respectively at 34 and 36, are shown. The side intake location 16, end intake location 22, and interior fluid communicating passages 27/29 extending to the outlet 26 are also shown. FIG. 3 is a further cutaway taken along line 3-3 of FIG. 1 and shows a half section of the housing 12 with second fan unit 33 with plate 36. Example interior fluid communicating passages 27/29, which in this example may be described as interior arcuate feed passageways, are also shown extending within the interior fluid communicating locations of the housing 12.

As shown in FIG. 2, the dual rotating first fan unit 31 and second fan unit 33 including magnet/electromagnet supporting plates 34 and 36, respectively define each of inlet and outlet side air/fluid movement fans. In one non-limiting example, the first plate section 34*a*/36*a* of each of the magnet/electromagnetic plates 34/36 each further include a plurality of pockets (see for example pockets at 38, 40, 42, et seq. in FIG. 1 in example plate 34). A plurality of magnets/electromagnets (selected ones being shown at 44, 46, 48, et seq. in FIG. 1) are installed within the pockets of both the magnet/electromagnet supporting plates 34 and 36 of the first fan unit 31 and second fan unit 33. As further shown in FIG. 2, selected magnets/electromagnets 44/46 are again shown integrated into the magnetic/electromagnetic plate 34 of first fan unit 31, with corresponding magnets/electromagnets 44'/46' further depicted incorporated into corresponding pockets in the magnetic/electromagnetic plate 36 of second fan unit 33.

In one non-limiting example, the pockets 38/40/42 are cylindrical and the corresponding magnets/electromagnets are shaped and sized to fit within the cylindrical pockets. Although shown in FIG. 1 with 10 pockets 38/40/42, additional or fewer pockets and corresponding magnets/electromagnets may be included. In another non-limiting example, the pockets 38/40/42 may be non-cylindrically shaped, such as, but not limited to, square, rectangular, trapezoidal, triangular, or other desired geometric profile. In one non-limiting example, the pockets 38/40/42 are not uniform but instead include at least two different geometric profiles. In another non-limiting example, first plate section 34*a*/36*a* may include no pockets and instead comprise a solid plate defining a magnet/electromagnet. Any example features of pockets 38/40/42 are equally applicable to any pockets included in the first plate section 34*a*/36*a* or in any other plate section of a fan unit described herein.

As best shown in FIG. 2, in one example each of the magnet/electromagnet supporting plates 34 and 36 are secured to the shaft 28 via laterally extending journaled mounting portions 50 and 52, respectively, and the magnet/electromagnet supporting plates 34/36 are arranged at spaced apart locations within the housing 12 so that the primary end fluid intake location 22 communicates air/fluid to a central location of the intake side of the first fan unit's 31 rotating magnetic/electromagnetic plate 34. A secondary warm air or fluid intake location 54 is further shown for admitting additional fluid (see directional arrows 56) to a fluid intake interior channel, or interior fluid communicating passage 29', located on the outlet side 25 of the housing 12 and spaced apart from an additional interior fluid communicating passage 29 also depicted in FIG. 3.

Without limitation, the configuration and material selection for each of the magnet/electromagnet supporting plates 34/36 are such that they can be selected from any conductive materials which can include varying patterns of materials, bi-materials or multi-materials designs, such including any of metals or alloys, ceramics or any metal ceramic composite materials with ferromagnetic, ferromagnetic, antiferromagnetic, paramagnetic or diamagnetic properties, or any combination of these materials. As understood, the magnet/electromagnet supporting plates 34/36 comprising these conductive materials and carrying, or including, the magnet/electromagnet possess properties necessary to generate adequate oscillating magnetic fields for inducing magnetic heating, or other fluid conditioning, resulting from the ability to either maintain or switch the magnet polarity at a sufficiently high rate in order for the generated friction to create the desired heat/cold profile.

The housing 12 can further be constructed with different materials. In one non-limiting example, the housing 12 may be constructed of insulating materials and may have its exterior 15 or interior 13 paneled or coated (such as at locations within the sub-chambers 51/53 of the housing 12 supporting the first fan unit 31 and second fan unit 33) with one or more conductive materials. In another non-limiting example, the housing 12 may be constructed with one or more conductive materials entirely. Such conductive material(s) can include varying patterns of materials, bi-materials or multi-material designs, such including any of metals or alloys, ceramics or any metal ceramic composite materials with ferromagnetic, ferrimagnetic, antiferromagnetic, paramagnetic or diamagnetic properties and, as understood, do not generate magnetic fields in this instance but are based on electromagnetic or magnetic induction such that they create eddy currents to allow for the frictional generation of heat in proximity to the plates 34/36 of corresponding first fan unit 31 and second fan unit. Without limitation, the housing 12 entirely, the interior 13, or the exterior 15 of the housing 12 can be paneled or covered with one or more conductive materials and also include one or more secondary integrated components including, but not limited to, any varying patterns of materials, bi-materials or multi-materials designs such materials including any suitable metal or alloy, ceramic or any metal-ceramic composite material or graphite or any combination of such conductive materials.

In one non-limiting example, each of the magnet/electromagnet plates 34/36 of the corresponding rotating fan units 31/33 includes the first plate section 34a/36a with corresponding first plurality of vanes 58/60/62/70/72/74 and the second plate section 34b/36b with the second plurality of vanes 64/66/68/76/78/80. In this example, individual inner (58/60/62/70/72/74) and outer (64/66/68/76/78/80) radial pluralities of circumferential spaced apart and arcuate shaped redirecting vanes surround the pluralities of magnets (again shown at 44,46, 48, et seq. for plate 34 in FIG. 1) supported on each plate 34/36. These are shown by inner radial plurality of vanes 58, 60, 62, et seq. and outer spaced radial plurality of vanes 64, 66, 68, et seq. for plate 34 and further by inner radial plurality of vanes 70, 72, 74, et seq. and outer spaced radial plurality of vanes 76, 78, 80, et seq. for plate 36. As further shown in this example, the respective inner and outer radial spaced pluralities of vanes can be arranged so that their arcuate profiles are opposing one another, this assisting in baffling or slowing of the outwardly directed fluid flows in order to maximize their thermal conditioning profiles.

In one non-limiting example, the first plurality of vanes 58/60/62/70/72/74 and second plurality of vanes 64/66/68/76/78/80 may include a straight profile, an angled profile relative to one another or relative to the other plurality of vanes, or may include additional or fewer vanes than shown in FIG. 1-3. Moreover, the profile and arrangement of the first plurality of vanes 58/60/62/70/72/74 and second plurality of vanes 64/66/68/76/78/80 may be determined in response to which of the first plate section 34a/36a and/or second plate section 34b/36b are rotating. In another non-limiting example, the plurality of vanes of each individual first plate section 34a/36a or second plate section 34b/36b may be arranged uniformly or non-uniformly.

In combination with the other features of the magnet/electromagnet supporting plates 34/36, the individual pluralities of vanes operate during rotation of the magnetic or electromagnetic plates 34/36 to influence (push) the inductive heated, or conditioned, air generated in the spaces between the rotating magnet/electromagnet arrays and the housing 12, and resulting from the frictional heat generating forces resulting from varying/oscillating magnetic fields, for delivery through the outlet 26 of the housing 12.

In one non-limiting example, the open spaces located within the interior of the housing 12 surrounding the magnet/electromagnet supporting first plate sections 34a/36a and/or second plate sections 34b/36b of the individual magnet/electromagnet plates 36 and 34 (for example, see again cutaway of FIG. 2 with end fluid intake location 22 and interior fluid communicating passage 27, 27', 29 and 29') are caused to become heated (or superheated) so that the fluid communicated through inlet fluid locations, 16, 18, 20, et seq. and end fluid intake location 22 is redirected via the circumferential arranged vanes 58/60/62/64/66/68 initially through the first fan unit 31 for a first or pre-heat operation. After passing through or around the first fan unit 31, the initial (or preheated) fluid patterns are subsequently redirected via the interior fluid communicating passage 27 and 29 shown in FIG. 3 cutaway to one side of the second fan unit 33. In addition to being communicated in a likewise combined radially outwardly and circumferentially directed fashion through the spaced apart pluralities of vanes 70/72/74/76/78/80 of the second fan unit 33 and around the second fan unit 33 in a secondary or reheating operation, additional fluid flow through intake location 56 passes through interior fluid communicating passage 27' to an opposite side communicating passage 29' of the second fan unit 33. Fluid flowing through the interior fluid communicating passage 27/27'/29/29' moves about the second fan unit 33 and is expelled by flowing out of the housing 12 through outlet 26.

In this non-limiting example, side inlet locations 16/18/20 and end intake location 22 are in fluid communication with the first fan unit 31 as well as interior space 37 and interior fluid communicating passage 27. Interior fluid communicating passage 27 is, in turn, in fluid communication with interior fluid communicating passage 29 which is in fluid communication with outlet 26 and second fan unit 33. Likewise secondary intake location 54, or inlet location, is in fluid communication with interior fluid communicating passage 27' which is in fluid communication with interior fluid communicating passage 29'. Interior fluid communicating passage 29' is in fluid communication with the second fan unit 33 and outlet 26.

In this fashion, the varying electromagnetic fields generated by the rotation of the magnets/electromagnets 44/46/48 supported within the first plate sections 34a/36a of the plates 34/36 inductive heat the interior channels and conductive interior of the housing 12. The inductive heating is again owing to the alternating fields generated by the rotation of the proximate located magnet/electromagnet supporting plates 34/36 in combination with the air or other fluid inducing and redirecting architecture of the vane patterns that are configured to concurrently draw air/fluid from the side inlet locations 16, 18, 20 and end intake location 22 and initially through the first fan unit 31 and plate 34 in the first (preheat/heating) operation (and across/along interior space 37 surrounding the first rotating plate 34 as shown in FIG. 2), following which the pre-heated fluid is redirected (via passages 27/29) in a similar fashion through the second fan unit 33 (or alternatively cooling fashion if using electromagnets instead of permanent magnets during the demagnetization of the plates to absorb heat from the fluid that is recirculated), with the conditioned fluid being communicated out the housing outlet 26. As further shown by FIGS. 2 and 3, secondary warm air, or fluid, inlet 54 again provides a concurrent fluid stream into the second fan unit 33 and plate 36 via interior fluid communicating passage 27'/29', this fluid flow passing along the outward radial/circumferential surface of plate 36 opposite that redirected along interior fluid communicating passage 27/29 and prior to being expelled through forward radial outlet 26.

Other non-limiting applications can include adapting the present technology for use in magnetocaloric heat pump (MHG) applications, such utilizing a magneto-caloric effect (MCE) provide either of heating or cooling properties resulting from the magnetization (heat) or demagnetization (cold) cycles. In one example, such applications achieve a coefficient of performance (defined as a ratio of useful heating or cooling provided to work required) which is greater than 1.0. In such an application, the system operates to convert work to heat as well as additionally pumping heat, or moving heated fluid, from a heat source to where the heat is required (and factoring in all power consuming auxiliaries).

As is further known in the relevant technical art, increasing the COP (such as potentially to a range of 2.0-3.5 or upwards) further result in significantly reduced operating costs in relation to the relatively small input electrical cost required for rotating the conductive plate(s) relative to the magnetic plate(s). Such considerations were generally limited to unimplementable ideas specially related to heating operations. In one example of this disclosure, Magnetic refrigeration techniques result in a cooling technology based on the magneto-caloric effect and which can be used to attain extremely low temperatures within ranges used in common refrigerators, such as without limitation in order to reconfigure the present system as a fluid chiller, air cooler, active magnetic regenerator or air conditioner.

As is further known in the relevant technical art, the magneto-caloric effect is a magneto-thermodynamic phenomenon in which a temperature change of a suitable material is again caused by exposing the material to a changing magnetic field, such being further known by low temperature physicists as adiabatic (defined as occurring without gain or loss of heat) demagnetization. In that part of the refrigeration process, a decrease in the strength of an externally applied magnetic field allows the magnetic domains of a magneto-caloric material to become disoriented from the magnetic field by the agitating action of the thermal energy (phonons) present in the material.

If the material is isolated so that no energy is allowed to (re)migrate into the material during this time, (i.e., again the adiabatic process) the temperature drops as the domains absorb the thermal energy to perform their reorientation. The randomization of the domains occurs in a similar fashion to the randomization at the curie temperature of a ferromagnetic, ferrimagnetic, antiferromagnetic, paramagnetic or diamagnetic material, except that magnetic dipoles overcome a decreasing external magnetic field while energy remains constant, instead of magnetic domains being disrupted from internal ferromagnetism, ferrimagnetism, antiferromagnetism, (or either of paramagnetism/diamagnetism) as energy is added. Applications of this technology can include, in one non-limited application, the ability to heat a suitable alloy arranged inside of a magnetic field, causing it to lose thermal energy to the surrounding environment which then exits the field cooler than when it entered.

Non-limiting applications of the present disclosure include the ability to generate heat for conditioning any fluid (not limited to water or air) utilizing either individually or in combination rare earth magnets placed into a high frequency oscillating magnetic field as well as static electromagnetic field source systems including such as energized, or powered, electromagnet assemblies which, in specific instances, can be combined together within a suitable system 10 not limited to that described and illustrated herein and for any type of electric induction, electromagnetic and magnetic induction application. In one example, the present assembly can be applied to any material which is magnetized, such including any of diamagnetic, paramagnetic, and ferromagnetic, ferrimagnetic or antiferromagnetic materials without exemption also referred to as magnetocaloric materials (MEMs).

Additional non-limiting features include the ability to reconfigure the system 10 so that the frictionally heated fluid existing between the overlapping rotating magnetic and stationary fluid communicating conductive plates may also include the provision of additional fluid mediums (both gaseous and liquid state) for better converting the heat or cooling configurations disclosed herein. Other non-limiting applications can include the provision of capacitive and resistance (ohmic power loss) designs applicable to all materials/different configurations as disclosed herein.

In one non-limiting example, in addition to the system 10 and methods as shown and described, the provision of any suitable programmable or software support mechanism, such as including a variety of operational modes. Such can include an Energy Efficiency Mode: step threshold function at highest COP (at established motor or input drive rpm) vs Progressive Control Mode: ramp-up curve at different rpm/COPs). Other modes may include a quick heating mode to speed up initial heating based on various heating profiles. In one non-limiting example, the fluid conditioning system 10 includes a controller configured to implement various operational modes.

Other heat/cooling adjustment variables can involve modifying the degree of magnetic friction created, such as by varying the distance between the conductive fluid circulating disk packages and alternating arranged magnetic/electromagnetic plates. A further variable can include limiting the exposure of the conductive fluid (gas, liquid, etc.,) to the first fan unit 31 and second fan unit 33, such that a no flow condition may result in raising the temperature (and which can be controllable for certain periods of time).

As is further generally understood in the technical art, temperature is limited to Curie temperature, with magnetic properties associated with losses above this temperature. Accordingly, rare earth magnets, including such as neodymium magnets, can achieve temperature ranges upwards of 900° C. to 1000° C.

Ferromagnetic, ferrimagnetic, antiferromagnetic, paramagnetic or diamagnetic materials, such as again which can be integrated into the conductive plates 34/36, can include any of Iron (Fe) having a Curie temperature of 1043K (degrees Kelvin), Cobalt (Co) having a Curie temperature of 1400K, Nickel (Ni) having a Curie temperatures of 627K and Gadolinium (Gd) having a Curie temperature of 292K.

The Curie point, also called Curie Temperature, defines a temperature at which certain magnetic materials undergo a sharp change in their magnetic properties. In the case of rocks and minerals, remanent magnetism appears below the Curie point—about 570° C. (1,060° F.) for the common magnetic mineral magnetite. Below the Curie point—by non-limiting example, 770° C. (1,418° F.) for iron—atoms that behave as tiny magnets spontaneously align themselves in certain magnetic materials.

In ferromagnetic materials, such as pure iron, the atomic magnets are oriented within each microscopic region (domain) in the same direction, so that their magnetic fields reinforce each other. In antiferromagnetic materials, atomic magnets alternate in opposite directions, so that their magnetic fields cancel each other. In ferrimagnetic materials, the spontaneous arrangement is a combination of both patterns, usually involving two different magnetic atoms, so that only partial reinforcement of magnetic fields occurs.

Given the above, raising the temperature to the Curie point for any of the materials in these three classes entirely disrupts the various spontaneous arrangements, and only a weak kind of more general magnetic behavior, called paramagnetism, remains. As is further known, one of the highest Curie points is 1,121° C. (2,050° F.) for cobalt. Temperature increases above the Curie point produce roughly similar patterns of decreasing paramagnetism in all three classes of materials such that, when these materials are cooled below their Curie points, magnetic atoms spontaneously realign so that the ferromagnetism, antiferromagnetism, or ferrimagnetism revives. As is further known, the antiferromagnetic Curie point is also referenced as the Neel temperature.

Other factors or variable controlling the temperature output can include the strength of the magnets/electromagnets 44/46/48 which are incorporated into the magnets/electromagnet supporting plates 34/36, such as again by selected rare earth magnets having varying properties or, alternatively, by adjusting the factors associated with the use of electromagnets including an amount of current through the coils, adjusting the core ferromagnetic properties (again though material selection) or by adjusting the coil winding density around the associated core.

Other non-limiting temperature adjustment features can include modifying the size, number, location and orientation of the assemblies (elongated and plural magnet/electromagnet and alternative conductive plates). Multiple units or assemblies can also be stacked, tiered or otherwise ganged in order to multiply a given volume of conditioned fluid which is produced. In one example, additional fan units may be included in the fluid conditioning system 10.

Additional non-limiting features can include varying the designing of the first fan unit 31 and second fan unit 33, such as not limited varying a thickness, positioning or configuration of a blade or other fluid flow redirecting profile integrated into the conductive plates, as well as utilizing the varying material properties associated with different metals or alloys, such including ferromagnetic, ferrimagnetic, antiferromagnetic, paramagnetic and diamagnetic properties.

Although not illustrated, additional embodiments can include redesigning the fluid conditioning system of the present invention to incorporate multiple stages greater than two. This can, in non-limiting fashion, include the current inlet and outlet sides described herein as constituting initial and final stages, with any number of intermediate intercommunicating chambers being similarly constructed and constituting additional fluid conditioning stages. Along these lines, it is further envisioned that the present system, assembly and method can be provided as a fixed or completed assembly incorporating any number of individual chambers or stages not limited to inlet and outlet chambers, as well as any type of stackable or tiered assembly having a modularized construction so that the a given assembly can be configured or reconfigured between different pluralities of chambers with each incorporating an inlet side, outlet side, and any desired number of intermediate chambers/stages.

Having described the example embodiments and features herein, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are included in light of the disclosure. Having thus described embodiments of the present disclosure, a person of ordinary skill in the art will recognize that changes may be made in form and detail without departing from the scope of the present disclosure. Thus, the present disclosure is limited only by the claims and is understood according to the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more individual, separated or integrated manner as is useful in accordance with a particular application. Additionally, any signal hatches in the drawings/figures should be considered only as exemplary, and not limiting, unless otherwise specifically specified.

I claim:

1. A multi-stage fluid conditioning system, comprising:
   a housing with a fluid inlet and a fluid outlet;

a shaft extending within said housing and supporting each of a first fan unit with a first magnet/electromagnet plate on an inlet side of said housing and a second fan unit with a second magnet/electromagnet supporting plate on an outlet side of said housing, wherein each of said first magnet/electromagnet supporting plate and said second magnet/electromagnet supporting plate include at least one vane configured to direct fluid flow;

each of said first and second magnet/electromagnet supporting plates further including an inner plate section and a radially outer second plate section, said inner and outer plate sections capable of being rotatable relative to each other; and wherein said shaft rotates at least one of said sections of said first magnet/electromagnet supporting plate and at least one of said sections of said second magnet/electromagnet supporting plate in order to draw a fluid flow through said inlet and across said first fan unit for thermal conditioning resulting from creation of high frequency oscillating magnetic fields according to a first conditioning operation, said fluid flow subsequently communicated across said second fan unit in a second conditioning operation before being outputted from said housing through said fluid outlet.

2. The system as described in claim 1, wherein said at least one vane on each of said first magnet/electromagnet supporting plate and second magnet/electromagnet supporting plate further comprise a first inner plurality of circumferentially arrayed vanes arrayed upon said inner plate sections and a second outer plurality of circumferentially arrayed vanes arrayed upon said outer plate sections.

3. The system as described in claim 2, wherein said first inner plurality of circumferentially arrayed vanes and said second outer plurality of circumferentially arrayed vanes are arranged in opposing directions.

4. The system as described in claim 1, wherein said fluid inlet further comprising each of a side inlet location and an end fluid inlet location associated with said first fan unit, a secondary fluid inlet associated with said second fan unit.

5. The system as described in claim 4, wherein said side inlet locations further comprise a plurality of slot shaped inlets extending circumferentially around a middle location of said housing, said end inlet location further including a center intake.

6. The system as described in claim 1, wherein said housing includes at least one of any metal or alloy, ceramic or any metal-ceramic composite material or graphite or combination of conductive materials.

7. The system as described in claim 6, wherein said housing further comprises an insulative material, wherein at least a portion of said insulative material is coated or paneled with at least one of a metal a metal alloy, a ceramic, a metal-ceramic composite, a graphite or other combination of conductive materials.

8. The system as described in claim 1, wherein said inner plate section of said first magnet/electromagnet supporting plate and second magnet/electromagnet supporting plate further comprising a plurality of circumferentially arranged pockets integrating a corresponding plurality of circumferentially arranged magnets/electromagnets disposed in the plurality of circumferentially arranged pockets.

9. The system as described in claim 8, wherein each said inner plate section further comprises a magnetic flux heated thermally conductive material.

10. The system as described in claim 9, wherein each of said first magnet/electromagnet supporting plate and said second magnet/electromagnet supporting plate further comprise any of a metal, a metal alloy, a ceramic, any metal-ceramic composite material, graphite or combination of conductive materials.

11. The system as described in claim 1, further comprising a motor or other rotationally inducing input for powering said shaft.

12. The system as described in claim 11, said motor or other rotational input further comprising a pair of motors, each motor associated with each of a first sub-chamber of said housing and a second sub-chamber of said housing.

13. The system as described in claim 1, further comprising said first conditioning operation and said second conditioning operation each further including either of heating or cooling operations.

14. A fluid conditioning system, comprising:
a conductive housing with a fluid inlet and a fluid outlet;
a shaft configured to rotate and extending within said housing and supporting a first fan unit with a first magnet/electromagnet supporting plate spaced apart from a second fan unit with a second magnet/electromagnet supporting plate, wherein the first fan unit is near the fluid inlet and the second fan unit is near the fluid outlet, wherein each of said first magnet/electromagnet supporting plate and second magnet/electromagnet supporting plate include at least one vane configured to direct fluid flow;

each of said first magnet/electromagnet supporting plate and second magnet/electromagnet supporting plate having a first inner plate section integrating a plurality of circumferentially arranged magnets or electromagnets and a second radially outer second plate section capable of being rotatable relative to said inner plate section; and wherein at least a first portion of said first magnet/electromagnet supporting plate and at least a second portion of said second magnet/electromagnet supporting plate are configured to rotate, and when said first portion and second portion rotate, a fluid flow is configured to be initially drawn across said first fan unit for thermal conditioning resulting from creation of high frequency oscillating magnetic fields according to a first conditioning operation, said fluid configured to be subsequently communicated across said second fan unit in a second conditioning operation, the fluid then configured to be output from the housing through the fluid outlet.

15. The system as described in claim 14, wherein said at least one vane on each of said first magnet/electromagnet supporting plate and second magnet/electromagnet supporting plate further comprise a first inner plurality of circumferentially arrayed vanes on arrayed upon said inner plate sections and a second outer plurality of circumferentially arrayed vanes arrayed upon said second plate sections.

16. The system as described in claim 14, wherein each said first plate section further comprises a magnetic flux heated thermally conductive material.

17. The system as described in claim 16, wherein each of the first magnet/electromagnet supporting plate and the second magnet/electromagnet supporting plate further comprises any of metal, alloys, ceramics, or any metal-ceramic composite material or graphite or combination of such conductive materials.

* * * * *